(12) United States Patent
Craig et al.

(10) Patent No.: US 8,362,640 B2
(45) Date of Patent: Jan. 29, 2013

(54) SYSTEM AND METHOD OF CONTROLLING A PLURALITY OF ENERGY LOADS AND ENERGY SUPPLIES IN A COORDINATED MANNER

(75) Inventors: Jason Craig, Fairfax, VA (US); Kevin Cassidy, Leesburg, VA (US); Richard Daniel Albarran, Bethesda, MD (US)

(73) Assignee: Enfuse Systems, Inc., Reston, VA (US)

( * ) Notice: Subject to any disclaimer, the term of this patent is extended or adjusted under 35 U.S.C. 154(b) by 673 days.

(21) Appl. No.: 12/503,648

(22) Filed: Jul. 15, 2009

(65) Prior Publication Data

US 2011/0012427 A1 Jan. 20, 2011

(51) Int. Cl.
| | |
|---|---|
| H02J 1/10 | (2006.01) |
| H02J 3/38 | (2006.01) |
| H02J 7/34 | (2006.01) |
| H02J 3/00 | (2006.01) |
| H02J 3/14 | (2006.01) |

(52) U.S. Cl. ............................................ 307/29; 307/18
(58) Field of Classification Search .................... 307/18, 307/29
See application file for complete search history.

(56) References Cited

U.S. PATENT DOCUMENTS

| | | | | |
|---|---|---|---|---|
| 5,020,411 | A | 6/1991 | Rowan | 89/1.11 |
| 6,157,527 | A | 12/2000 | Spencer et al. | 361/64 |
| 6,252,311 | B1 | 6/2001 | West | 307/29 |
| 6,614,204 | B2 | 9/2003 | Pellegrino et al. | 320/109 |
| 6,816,466 | B1 | 11/2004 | Daniel | 370/254 |
| 7,353,653 | B2 | 4/2008 | Bronicki | 60/646 |
| 7,379,791 | B2 | 5/2008 | Tamarkin et al. | 700/286 |
| 7,402,978 | B2 | 7/2008 | Pryor | 320/104 |
| 7,428,816 | B2 | 9/2008 | Singh et al. | 60/651 |
| 7,719,257 | B2 | 5/2010 | Robarge et al. | 324/117 R |
| 2003/0153216 | A1 | 8/2003 | Van-Drentham-Susman | 440/45 |
| 2004/0174071 | A1 | 9/2004 | Nierlich et al. | 307/11 |
| 2005/0008904 | A1 | 1/2005 | Suppes | 429/9 |
| 2005/0084721 | A1* | 4/2005 | Ikuma et al. | 429/22 |
| 2005/0252214 | A1 | 11/2005 | Goldmeer et al. | 60/698 |
| 2006/0049694 | A1 | 3/2006 | Kates | 307/132 E |
| 2006/0052905 | A1 | 3/2006 | Pfingsten et al. | 700/286 |
| 2006/0228960 | A1 | 10/2006 | Durling | 440/88 |
| 2006/0261213 | A1* | 11/2006 | Lavan | 244/30 |
| 2007/0128473 | A1 | 6/2007 | Durling et al. | 429/13 |
| 2007/0128478 | A1 | 6/2007 | Ballantine et al. | 429/17 |
| 2007/0137686 | A1 | 6/2007 | Durling et al. | 136/205 |
| 2008/0019067 | A1 | 1/2008 | Reynolds et al. | 361/93.1 |
| 2008/0224892 | A1 | 9/2008 | Bogolea et al. | 340/870.3 |
| 2008/0255782 | A1 | 10/2008 | Bilac et al. | 702/62 |
| 2009/0106571 | A1 | 4/2009 | Low et al. | 713/310 |
| 2009/0144568 | A1 | 6/2009 | Fung | 713/300 |
| 2009/0234512 | A1 | 9/2009 | Ewing et al. | 700/295 |
| 2010/0030392 | A1 | 2/2010 | Ferentz et al. | 700/295 |
| 2010/0102625 | A1 | 4/2010 | Karimi et al. | 307/9.1 |
| 2010/0225167 | A1* | 9/2010 | Stair et al. | 307/29 |

* cited by examiner

FOREIGN PATENT DOCUMENTS

| | | |
|---|---|---|
| WO | WO 2008/113052 | 9/2008 |
| WO | WO 2011/103262 | 8/2011 |

*Primary Examiner* — Rexford Barnie
*Assistant Examiner* — Dru Parries
(74) *Attorney, Agent, or Firm* — Pillsbury Winthrop Shaw Pittman LLP

(57) ABSTRACT

The operation and/or power of a plurality of energy loads and/or energy supplies configured to supply power to the energy loads are managed in a coordinated manner. The coordinated control over the energy loads and/or energy supplies may enable the execution of missions including a one or more objectives by energy loads with an enhanced efficiency, autonomy, and/or effectiveness. Aspects of the planning and/or management of execution of the missions may be automated according to predetermined rules and/or criteria.

22 Claims, 2 Drawing Sheets

SYSTEM AND METHOD OF CONTROLLING A PLURALITY OF ENERGY LOADS AND ENERGY SUPPLIES IN A COORDINATED MANNER

FIELD OF THE INVENTION

The invention relates to controlling a plurality of energy loads and/or energy supplies to execute a mission. In particular, the performance of the energy loads and/or energy supplies may be enhanced with respect to one or more mission criteria.

BACKGROUND OF THE INVENTION

Systems that provide for coordinated control over a plurality of system loads to execute a predetermined plan are known. While such systems may manage the provision of power from energy supplies to the system loads, these systems tend to be relatively static. The reconfiguration of the number and/or types of system loads and/or energy supplies that can be added and/or removed from the system may be limited, if not impossible. Similarly, the coordinated control may be relatively static and may not account for changing conditions within the system loads and energy supplies, and/or the environment surrounding these components. In conventional systems, the system loads and/or energy supplies may not be implemented with enhanced efficiency because the control over these components may not be determined based on component capabilities and/or operating conditions.

SUMMARY

One aspect of the invention relates to controlling the operation and/or power of a plurality of energy loads and/or energy supplies configured to supply power to the energy loads. The coordinated control over the energy loads and/or energy supplies may enable the execution of missions including a one or more objectives by energy loads with an enhanced efficiency, autonomy, and/or effectiveness. Aspects of the planning and/or management of execution of the missions may be automated according to predetermined rules and/or criteria.

The energy loads and/or energy supplies may be associated with a discrete physical vehicle, vehicle, building (permanent or temporary), building complex, and/or other physical system. The operation and/or power of the set of system energy loads associated with its associated physical system may be managed so as to enhance the effectiveness, efficiency, ease of control, and/or other aspects of the associated physical system as the physical system performs pre-defined missions. A "mission," as used herein, may refer at least to a set of one or more tasks and/or objectives to be accomplished by the physical system (and/or its system energy loads). A mission may include a schedule, an order, and/or other temporal parameters for the performance of the tasks and/or objectives of the mission.

As an example, the physical system may include an unmanned underwater vehicle, and the energy loads and/or energy supplies may be carried by the unmanned underwater vehicle. The operation and/or power of the energy loads and energy supplies associated with the unmanned underwater vehicle may be managed as the unmanned underwater vehicle executes a mission with one or more predefined tasks, objectives, and/or parameters. As another example, the physical system may include a temporary building or shelter (e.g., a tent) configured to serve a predefined purpose (e.g., command, surveillance, and/or other purposes). Other examples of the physical systems that may be associated with the managed energy loads and/or energy supplies are contemplated.

The energy loads may include system components that are payloads in that they require power to perform their associated functionality. The functionality associated with the different energy loads may be varied. For example, the energy loads may include one or more of a sensor configured to detect an environment parameter, a communications device, a propulsion mechanism, a steering and/or directional mechanism, a processing device, an electromagnetic radiation and/or sound source, navigation system, a motor, and/or other components.

The energy supplies include system components capable of providing power to the energy loads. These components may include power generators, energy harvesters, and energy storage units (e.g., a battery), and/or other components.

A control system configured to control and/or manage the energy loads and/or energy sources may include one or more of a plurality of load interfaces, a plurality of supply interfaces, a communication interface, electronic storage, a processor, and/or other components.

The load interfaces may be configured to removably couple the energy loads to the control system so that energy loads can be swapped in and/or out of the overall system. Via the load interfaces, information may be communicated between the control system and the energy loads. Similarly, the supply interfaces may be configured to removably couple the energy supplies to the control system such that information may be communicated between the control system and the energy loads. The load interfaces and/or the supply interfaces may be configured to enable any of a plurality of different types of energy loads and/or supplies to be releasably coupled to the control system in a uniform manner. As such, the load interfaces and/or the supply interfaces may be configured to interface energy loads and/or supplies of a variety of different types, with different power and communication requirements and/or specification to be coupled with the control system. This, along with other features of the control system, may create a "plug-and-play" aspect of the control system in which individual energy loads and/or energy supplies can be selectively connected and/or disconnected with the control system to provide the external system associated with the control system with selected capabilities and/or attributes, without reconfiguring the rest of the external system or the control system.

The load interfaces and/or the supply interfaces may form part of a power distribution sub-system within the control system that couples the energy supplies with the energy loads and/or with each other for the transmission of power therebetween. For example, the power distribution sub-system may include a bus that enables power and/or information to be exchanged between the load interfaces and the supply interfaces. The power distribution system may include a controller. The controller may serve as an interface for the power distribution sub-system with the rest of the control system.

The processor may be configured to execute one or more computer program modules. The one or more computer program modules may include one or more of a load module, a supply module, a mission interface module, a plan module, an execution module, and/or other modules.

The load module may be configured to obtain information related to the energy loads coupled with the control system. The load module may obtain such information via the communication interface from an external entity (e.g., a user, an external database, and/or other external entities), from the energy loads themselves (e.g., over the load interfaces), and/or other information sources. In some implementations, the load module may obtain information related to the energy loads automatically. The information related to the energy loads may be obtained by the load module at start-up of the control system and/or the energy loads, upon installation of an energy load at a load interface, in an ongoing manner during operation of the energy loads, and/or at other times.

The information related to the energy loads obtained by the load module may include one or more of a parameter of required power, a functional capability, an operating status, a control mode, a load type, an output signal indicating an environmental parameter, an operating condition, and/or other information. A parameter of required power may include, for example, one or more of a polarity, alternating current, direct current, voltage amount, current amount, frequency, phase, and/or other parameters. A functional capability may include, for example, one or more of a sensitivity (e.g., for sensor/detector loads), a thrust parameter (e.g., for propulsion loads), a transmission capability (e.g., for communications loads), and/or other information identifying and/or quantifying the functional capabilities of one or more of the energy loads. An operating status may include, for example, one or more of a powered off status, a powered on status, an offline status, an online status, a limited operational status, a full operational status, a malfunction status, and/or other statuses of the energy loads. A control mode may include, for example, an automated mode, a manual control mode (e.g., by an external entity), and/or other control modes. An operating condition may include, for example, an output, an operating temperature, an operating efficiency, an operating speed, an operating rate, and/or other operating conditions.

The supply module may be configured to obtain information related to the energy supplies coupled with the control system. The supply module may obtain such information from an external entity (e.g., a user, an external database, and/or other external entities), from the energy supplies themselves (e.g., over the supply interfaces), and/or other information sources. In some implementations, the supply module may obtain information related to the energy supplies from one or more external entities automatically. For example, one of the energy supplies may transmit a load identifier to the supply module, and the supply module may request information related to the load associated with the load identifier from an external entity. The information related to the energy supplies may be obtained by the supply module at start-up of the control system and/or the energy supplies, upon installation of an energy supply at a supply interface, in an ongoing manner during operation of the energy supplies, and/or at other times.

The information related to the energy supplies obtained by the supply module may include one or more of a parameter of supplied power, a maximum capacity, a current capacity, a harvesting parameter, an operating status, a control mode, an energy supply type, a resource availability, an operating condition, a discharge rate, and/or other information. A parameter of supplied power may include, for example, a polarity, alternating current, direct current, voltage amount, current amount, frequency, phase, and/or other parameters. A harvesting parameter may include, for example, a parameter of power that can be generated through a harvesting generator, a parameter that impacts power generated by and/or the generation process of a harvesting generator, and/or other parameters related to the harvesting of energy. An operating status may include, for example, one or more of a powered off status, a powered on status, an offline status, an online status, a limited operational status, a full operational status, a malfunction status, and/or other statuses of the energy loads. A control mode may include, for example, an automated mode, a manual control mode (e.g., by an external entity), and/or other control modes. A resource availability may refer to and/or quantify an availability of a resource used by one of the energy supplies to generate energy. An operating condition may include, for example, an output, an operating temperature, an operating efficiency, an operating speed, an operating rate, and/or other operating conditions.

The mission interface module may be configured to obtain information related to a mission to be performed by the energy loads (and/or the energy supplies) coupled to the control system. This information may include objectives and/or tasks, specific ones of the energy loads that are to perform the objectives and/or tasks, temporal parameters, mission criteria, and/or other information related to a mission. The information may be obtained over the communication interface from an external entity. By way of non-limiting example, a user may input information defining a mission to the control system via the communication interface.

The plan module may be configured to generate a mission plan for executing a mission defined by information obtained by the mission interface module. A mission plan may identify specific functions to be performed by individual ones of the energy loads in order to fulfill the tasks and/or objectives of the mission. The mission plan may include temporal parameters, such as timing, duration, and/or other parameters, for performance of the specific functions by the individual ones of the energy loads that enable the energy loads to satisfy any temporal parameters of the mission. The mission plan may identify specific functions to be performed by individual ones of the energy supplies to provide power sufficient to enable the energy loads to perform the objectives and/or tasks of the mission. The mission plan may include temporal parameters, such as timing, duration, and/or other parameters, for performance of the specific functions to be performed by the individual energy supplies to ensure that the power provided to the energy loads will be provided at the appropriate times.

In some instances, functions to be performed by individual ones of the energy supplies may be conditional on performance of one or more of the energy supply. For example, the mission plan may indicate that one or more of the energy supplies are to remain "on" (providing power) until a specified one or more of the energy loads have completed an assigned function (e.g., arrived at a predetermined location, and/or other functions).

Upon receiving information defining a mission plan from the mission interface module and information related to the energy loads and energy supplies from the load module and the supply module, the plan module may analyze the information to ensure that all of the tasks and/or objectives can be performed by the current configuration of the energy loads and the energy supplies being managed by the system. This may involve running the information defining the mission through a rules-based analysis that identifies tasks, objectives, and/or combinations of tasks and/or objectives that are not within the capabilities of the current energy loads and/or energy supplies. For example, a task or objective may not be within the capabilities of the current energy loads and/or energy supplies if the energy loads do not include energy load(s) capable of performing a function necessary for completing a task or objective. As another example, if the energy supplies are not capable of providing power that enables the energy loads to perform a function necessary for completing a task or objective, then that task or objective may not be within the capabilities of the current energy loads and/or energy supplies. As another example, temporal restraints associated with one or more tasks and/or objectives may be beyond the capabilities of the energy loads and/or the ability of the energy supplies to power the energy loads.

The rules used to determine whether all of the tasks and/or objectives can be performed by the current configuration of energy loads and energy supplies being managed by the control system may be somewhat dynamic (e.g., changing automatically over time) in that they may be based on the current configuration of the energy loads and energy supplies. As the information obtained by the load module and/or the supply module indicates that one or more of the energy loads and/or energy supplies has been added and/or removed, then the rules may adapt automatically to accommodate such changes.

If the plan module determines that one or more of the objectives and/or tasks associated with a mission cannot be completed, the plan module may generate a notification to the external entity that input the mission to the control system. If the plan module determines that two or more of the objectives and/or tasks associated with a mission conflict (less than all of them can be completed with existing capabilities/resources), the plan module may determine which of the conflicting objectives and/or tasks should be performed. This determination may be based on user-selection, on a predetermined prioritization of objectives and/or tasks, and/or to minimize the number of objectives and/or tasks that are omitted from the mission plan.

In some cases, certain tasks and/or objectives within a given plan may be accomplished by the energy loads and/or the energy supplies in a variety of different combinations. The plan module may designate a possible combination of energy loads and/or energy supplies (and/or temporal parameters) such that the cumulative performance of the energy loads and/or the energy supplies over the course of the mission will be enhanced with respect to one or more predetermined criteria. By way of non-limiting example, such criteria may include energy efficiency, temporal speed, mission endurance, and/or other criteria. The criteria for a given mission may be established by the information obtained by the mission interface module related to the mission, by a system setting, and/or otherwise established.

In some implementations, the load module and/or the supply module may be configured to obtain information related to the energy loads and/or the energy supplies during the execution of a mission. In such implementations, the plan module may be configured to adjust the mission plan to accommodate changing and/or unforeseen circumstances. For example, one or more of the energy loads and/or energy supplies may not operate at its typical capacity, efficiency, and/or effectiveness, which may require adjustment of the mission plan. As another example, environmental conditions may inhibit and/or aid performance of the tasks and/or objectives in the mission, thereby requiring the adjustment of the mission plan. For instance, under certain ambient temperature conditions, some types of batteries may deliver less efficiently than other attached energy supplies (e.g., a fuel cell). As another example, an amount of stored energy within one or more of the energy supplies may fall below an anticipated and/or threshold amount, which may require adjustment of the mission plan to account for the unexpectedly low amount of stored energy. Other examples of circumstances that may result in adjustment of the mission plan by the plan module are contemplated.

Adjustments to the mission plan made by the plan module as the mission is ongoing may be determined to maintain enhanced cumulative performance of the energy loads and/or the energy supplies with respect to the mission criteria. However, in some implementations, information obtained by the load module and/or the supply module related to current circumstances during execution of the mission may result in changes being made by the plan module to the criteria used to determine the mission plan.

The execution module may be configured to generate machine-readable instructions for the energy loads and/or the energy supplies, and to communicate the instructions to the energy loads and/or the energy supply with appropriate timing to cause the energy loads and/or the energy supplies to execute the mission plan. The instructions may be communicated to the energy loads and/or energy supplies through the power distribution sub-system (e.g., the load interfaces and/or supply interfaces). In some implementations, instructions generated by the execution module may be translated, formatted, and/or otherwise altered by the controller of the power distribution sub-system controller to be usable by the specific energy load and/or energy supply for which the instructions are intended. In some implementation, this functionality may be provided by the execution module, rather than the power distribution sub-system controller.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
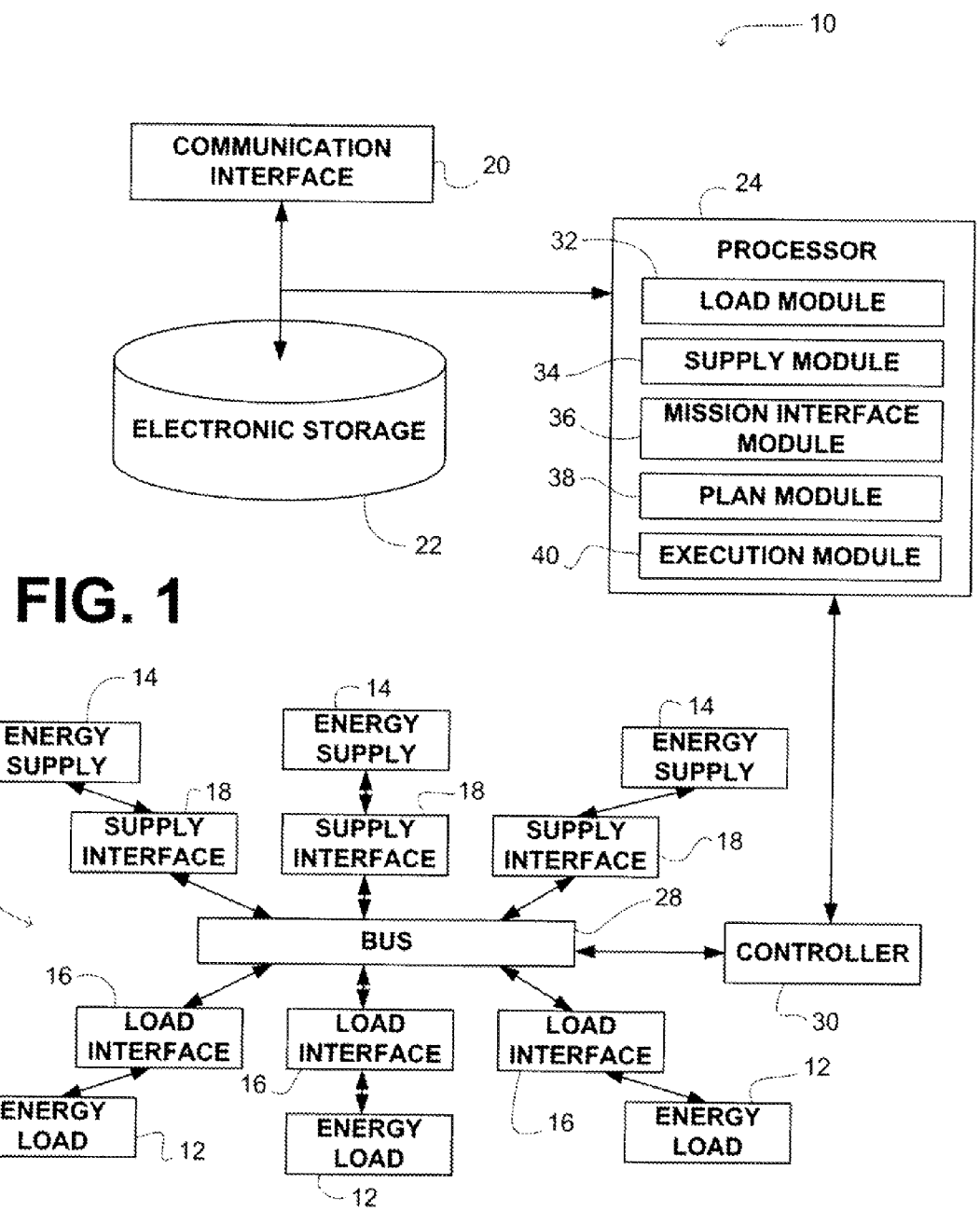
FIG. 1 illustrates a system configured to control and/or power a plurality of energy loads, in accordance with one or more embodiments of the invention.

FIG. 1 illustrates a system 10 configured to control and/or power a plurality of energy loads 12. The power supplied to energy loads 12 may be provided by a plurality of energy supplies 14. The system 10 may further control and/or manage energy supplies 14 to provide power to energy loads 12 to enable energy loads 12 to operate. The system 10 may be configured to plan and manage the execution missions including a one or more objectives by energy loads 12 with an enhanced efficiency, autonomy, and/or effectiveness. Aspects of the planning and/or management of execution of the missions may be automated by system 10 according to predetermined rules and/or criteria. The system 10 may include one or more of a plurality of load interfaces 16, a plurality of supply interfaces 18, a communication interface 20, electronic storage 22, a processor 24, and/or other components.

System 10 may be associated with a discrete physical vehicle, vehicle, building (permanent or temporary), building complex, and/or other physical system associated with a set of system energy loads. System 10 may manage the operation and/or power of the set of system energy loads associated with its associated physical system so as to enhance the effectiveness, efficiency, ease of control, and/or other aspects of the associated physical system as the physical system performs pre-defined missions. A "mission," as used herein, refers at least to a set of tasks and/or objectives to be accomplished by the physical system (and/or its system energy loads). A mission may include a schedule, an order, and/or other temporal parameters for the performance of the tasks and/or objectives of the mission.

One or more of the components of system 10 may be carried by the physical system with which it is associated. For example, the physical system may include an unmanned underwater vehicle, and system 10 may be carried by the unmanned underwater vehicle to control the operation and power of the energy loads and energy supplies associated with the unmanned underwater vehicle as the unmanned underwater vehicle executes a mission with one or more predefined tasks, objectives, and/or parameters. As another example, the physical system may include a temporary building or shelter (e.g., a tent) configured to serve a predefined purpose (e.g., command, surveillance, and/or other purposes). Other examples of the physical systems that may be associated with system 10 are contemplated.

Energy loads 12 may include system components that are payloads in that they require power to perform their associated functionality. The functionality associated with the different energy loads 12 may be varied. For example, energy loads 12 may include one or more of a sensor configured to detect an environment parameter, a communications device, a propulsion mechanism, a processing device, a navigation system, a motor, and/or other components.

A sensor configured to detect an environment parameter may include a sensor that detects one or more of a temperature (water and/or air), motion, sound waves (audible and/or non-audible), electromagnetic radiation, seismic activity, and/or other parameters. A sensor configured to detect an environment parameter may include a sensor that captures images of its environment. These may include still and/or video images.

One or more of the energy loads 12 that are not configured to detect an environment parameters, and/or one or more of load interfaces 16 may include one or more sensors and/or detectors configured to monitor the operation of the energy load 12 and/or its corresponding load interface 16. By way of non-limiting example, the energy load 12 and/or its load interface 16 may include one or more sensors configured to monitor one or more of a power parameter (e.g., power consumption, voltage, current drawn, etc.), an operating temperature of the energy load 12 and/or its load interface 16, an operational parameter (e.g., speed, sensitivity, operating state, and/or other parameters), and/or other information related to the operation of the energy load 12 and/or its load interface 16.

A communications device may include a device that enables communication within system 10, another one of energy loads 12, and/or with external entities. The information communicated via a communications device may include system information, information related to detected environmental parameters, system control information, location information, and/or other information. Some non-limiting examples of a communications device may include an antennae, a transmitter, a transponder, a modulator/demodulator, and/or other devices.

A propulsion mechanism may include a mechanism for enabling locomotion of the physical system carrying some or all of the components of system 10. This may include mechanisms that enable guidance and/or steering of physical system as well as or instead of just linear motion. In implementations where the physical system includes a maritime vehicle, a propulsion mechanism may include, for example, an engine driven propeller, a thruster, an engine driven impeller, and/or other propulsion mechanisms.

A processing device may include a device that processes signals and/or information within system 10 (e.g., processor 24, described below). In some instances, one or more of the sensors and/or communications devices may include processing devices (e.g., microprocessors and/or other processing devices). In some instances, a processing device may include a processor or controller that executes the functionality attributed below system management processor.

According to various implementations, energy supplies 14 include system components capable of providing power to energy loads 12. These components may include power generators, energy storage units (e.g., a battery), and/or other components.

One or more of energy supplies 14 may include a fuel cell. In some implementations, the fuel cell may include a solid-oxide fuel cell. One or more of energy supplies 14 may include a waste energy harvester that harvests waste heat generated by one of the other energy supplies 14. For example, the waste energy harvester may harvest waste heat generated by a fuel cell to provide an additional source of power. One or more of energy supplies 14 may include a parasitic energy generator that generates power during operation one or more of energy loads 12. For instance, in implementations where the physical system carrying system 10 includes a maritime vehicle, the parasitic energy generator may convert a portion of the kinetic energy of the vehicle generated by an energy load 12 that includes a propulsion mechanism into power. By way of example, the parasitic energy generator may include one or more impellers that are driven by fluid through which the vehicle is moving. Rotation of the impellers by the fluid may provide be implemented by a generator coupled with the impellers to provide power. One or more of energy supplies 14 may generate power from energy available in the environment. For example, one energy supply 14 may include one or more solar cells that convert electromagnetic radiation from the sun to power. As another example, one energy supply 14 may include a power generator that converts tidal energy of the ocean into power. As another example, one energy supply may include one or more wind turbines that convert wind into power.

One or more energy supply 14 may include an energy storage unit, such as one or more batteries, one or more capacitors, or other devices. As a non-limiting example, the energy storage unit may include a lithium-ion battery. An energy storage unit may be used to selectively distribute previously stored power to energy loads 12. For instance, if the other energy supplies 14 are not generating power sufficient for the operation of energy loads 12, power may be distributed from the energy storage unit to supplement the power being generated. The power stored within the energy storage unit may include power stored prior to the commencement of a mission or task by energy loads 12, and/or may include power derived from the other energy supplies 14 during a mission or task.

The load interfaces 16 may be configured to removably couple energy loads 12 to system 10. Via load interfaces 16, information may be communicated between system 10 and energy loads 12. Similarly, supply interfaces 18 may be configured to removably couple energy supplies 14 to system 10 such that information may be communicated between system 10 and energy loads 12. The load interfaces 16 and/or supply interfaces 18 may be configured to enable a plurality of different types of energy loads and/or supplies to be coupled to system 10 in a uniform manner. As such, load interfaces 16 and/or supply interfaces 18 may be configured to interface energy loads and/or supplies of a variety of different types, with different power and communication requirements and/or specification to be coupled with system 10. This, along with other features of system 10, may create a "plug-and-play" aspect of system 10 in which individual energy loads 12 and/or energy supplies 14 can be selectively connected and/or disconnected with system 10 to provide the external system associated with system 10 with the appropriate capabilities and/or attributes, without reconfiguring the rest of the external system or system 10.

The load interfaces 16 and/or supply interfaces 18 may form part of a power distribution system 26 that couples energy supplies 14 with energy loads 12 and/or with each other for the transmission of power therebetween. For example, power distribution system 26 may include a bus 28 that enables power and/or information to be exchanged between load interfaces 16 and supply interfaces 18. The power distribution system 26 may include a controller 30. Controller 30 may serve as an interface for power distribution system 26 (e.g., including load interfaces 16, supply interfaces 18, and/or bus 28) as discussed further below.

One or more of the energy supplies 14 and/or one or more of supply interfaces 18 may include one or more sensors and/or detectors configured to monitor the operation of the energy supply 14 and/or its corresponding supply interface 18. By way of non-limiting example, the energy supply 14 and/or its supply interface 18 may include one or more sensors configured to monitor one or more of a power parameter (e.g., power supplied, voltage, current drawn and/or supplied, and/or other parameters.), an operating temperature of the energy supply 14 and/or its supply interface 18, an operational parameter (e.g., capacity, voltage, and/or other parameters), and/or other information related to the operation of the energy supply 14 and/or its supply interface 18.

In some implementations, the functionality and features of load interfaces 16, supply interfaces 18, bus 28, and/or controller 30 may be the same as or similar to the functionality and features of a power distribution system described in U.S. patent application Ser. No. 12/364,430, filed Feb. 2, 2009, hereby incorporated by reference into the present application in its entirety. In some implementations, load interfaces 16 and/or supply interfaces 18 may be coupled communicatively to system 10 without controller 30.

The communication interface 20 may be configured to facilitate communication between system 10 and/or one or more external entities. By way of non-limiting example, the one or more external entities may include one or more users, one or more external applications and/or processors, one or more external networks, and/or other entities that are external to system 10. The communication interface 20 may include one or more Application Programming Interfaces (APIs) that enable external entities to interface with system 10. The communication interface 20 may include a user interface application or device configured to provide one or more users with control over and/or information about the operation of system 10, energy loads 12, and/or energy supplies 14. The information communicated with system 10 over communication interface 20 may include missions to be executed by energy loads 12 and/or energy supplies 14, control information from an external entity (e.g., from a user) effecting manual manipulation and/or control over execution of a mission, information related to the execution of a mission (e.g., operational information, status information, environmental information, and/or other information), and/or other information.

Electronic storage 22 comprises electronic storage media that electronically stores information. The electronic storage media of electronic storage 22 may include one or both of system storage that is provided integrally (i.e., substantially non-removable) with system 10 and/or removable storage that is removably connectable to system 10 via, for example, a port (e.g., a USB port, a firewire port, a serial port, and/or other ports) or a drive (e.g., a disk drive, and/or other drives). Electronic storage 22 may include one or more of optically readable storage media (e.g., optical disks, and/or other optically readable storage media), magnetically readable storage media (e.g. magnetic tape, magnetic hard drive, floppy drive, and/or other magnetically readable media), electrical charge-based storage media (e.g., EEPROM, RAM, and/or other charge-based storage media), solid-state storage media (e.g., flash drive, and/or other other solid-state storage media), and/or other electronically readable storage media. Electronic storage 20 may store software algorithms, information determined by processor 24, information received via communication interface 20, and/or other information that enables system 10 to function properly. Electronic storage 20 may be a separate component within system 10, or electronic storage 20 may be 22 integrally with one or more other components of system 10 (e.g., processor 24).

Processor 24 may be configured to provide information processing capabilities in system 10. As such, processor 24 may include one or more of a digital processor, an analog processor, a digital circuit designed to process information, an analog circuit designed to process information, a state machine, and/or other mechanisms for electronically processing information. Although processor 24 is shown in FIG. 1 as a single entity, this is for illustrative purposes only. In some implementations, processor 24 may include a plurality of processing units. These processing units may be physically located within the same device, or processor 24 may represent processing functionality of a plurality of devices operating in coordination.

As is shown in FIG. 1, processor 24 may be configured to execute one or more computer program modules. The one or more computer program modules may include one or more of a load module 32, a supply module 34, a mission interface module 36, a plan module 38, an execution module 40, and/or other modules. Processor 24 may be configured to execute modules 32, 34, 36, 38, and/or 40 by software; hardware; firmware; some combination of software, hardware, and/or firmware; and/or other mechanisms for configuring processing capabilities on processor 24.

It should be appreciated that although modules 32, 34, 36, 38, and 40 are illustrated in FIG. 1 as being co-located within a single processing unit, in implementations in which processor 24 includes multiple processing units, one or more of modules 32, 34, 36, 38, and/or 40 may be located remotely from the other modules. The description of the functionality provided by the different modules 32, 34, 36, 38, and/or 40 described below is for illustrative purposes, and is not intended to be limiting, as any of modules 32, 34, 36, 38, and/or 40 may provide more or less functionality than is described. For example, one or more of modules 32, 34, 36, 38, and/or 40 may be eliminated, and some or all of its functionality may be provided by other ones of modules 32, 34, 36, 38, and/or 40. As another example, processor 38 may be configured to execute one or more additional modules that may perform some or all of the functionality attributed below to one of modules 32, 34, 36, 38, and/or 40.

The load module 32 may be configured to obtain information related to energy loads 12 coupled with system 10 via power distribution system 26 (e.g., at load interfaces 16). Load module 32 may obtain such information via communication interface 20 from an external entity (e.g., a user, an external database, and/or other external entities), from the energy loads 12 themselves (e.g., over load interfaces 16), and/or other information sources. In some implementations, load module 32 may obtain information related to energy loads 12 from one or more external entities automatically. For example, one of energy loads 12 may transmit a load identifier to load module 32, and load module 32 may request information related to the load associated with the load identifier from an external entity. The information related to energy loads 12 may be obtained by load module 32 at start-up of system 10 and/or energy loads 12, upon installation of an energy load 12 at a load interface 16, in an ongoing manner during operation of energy loads 12, and/or at other times.

The information related to energy loads 12 obtained by load module 32 may include one or more of a parameter of required power, a functional capability, an operating status, a control mode, a load type, an output signal indicating an environmental parameter, an operating condition, and/or other information. A parameter of required power may include, for example, one or more of a polarity, alternating current, direct current, voltage amount, current amount, frequency, phase, and/or other parameters. A functional capability may include, for example, one or more of a sensitivity (e.g., for sensor/detector loads), a thrust parameter (e.g., for propulsion loads), a transmission capability (e.g., for communications loads), and/or other information identifying and/or quantifying the functional capabilities of one or more of energy loads 12. An operating status may include, for example, one or more of a powered off status, a powered on status, an offline status, an online status, a limited operational status, a full operational status, a malfunction status, and/or other statuses of energy loads 12. A control mode may include, for example, an automated mode, a manual control mode (e.g., by an external entity), and/or other control modes. An operating condition may include, for example, an output, an operating temperature, an operating efficiency, an operating speed, an operating rate, and/or other operating conditions.

At least some of the information related to a given energy load 12 may be entered and/or edited by a user via communications interface 20. The information entered and/or edited by the user may include the information described above. The information entered and/or edited by the user may include operational settings for the given energy load 12. For example, if the given energy load 12 includes a motor, the user may designate a speed (or range of speeds) for a LO setting, a different speed (or range of speeds) for a MID setting, and a different speed (or range of speeds) for a Hi setting. It will be appreciated that this exemplary load type (motor), operation parameter(s) to which the settings correspond (motor speed), number of settings (3), and/or other aspects of the example above are not intended to be limiting.

The information entered and/or edited by the user may include the assignment of variables. These variables may be assigned to identify one or more specific energy loads 12, specific functions provided by one or more energy loads 12, specific operational settings of a given energy load 12, and/or other possible values for the variables. For example, with respect to the example set forth above where the given energy load 12 includes a motor, a variable may be assigned to each of the HI setting, the LO setting, and the MID setting. Then during the execution of a mission, the motor may be set to operate at one of these settings by calling the appropriate variable.

The supply module 34 may be configured to obtain information related to energy supplies 14 coupled with system 10 via power distribution system 26 (e.g., at supply interfaces 18). Supply module 34 may obtain such information via communication interface 20 from an external entity (e.g., a user, an external database, and/or other external entities), from the energy supplies 14 themselves (e.g., over supply interfaces 18), and/or other information sources. In some implementations, supply module 34 may obtain information related to energy supplies 14 from one or more external entities automatically. For example, one of energy supplies 14 may transmit a load identifier to supply module 34, and supply module 34 may request information related to the load associated with the load identifier from an external entity. The information related to energy supplies 14 may be obtained by supply module 34 at start-up of system 10 and/or energy supplies 14, upon installation of an energy supply 14 at a supply interface 18, in an ongoing manner during operation of energy supplies 14, and/or at other times. (55) The information related to energy supplies 14 obtained by supply module 34 may include one or more of a parameter of supplied power, a maximum capacity, a current capacity, a harvesting parameter, an operating status, a control mode, an energy supply type, a resource availability, an operating condition, a discharge rate, and/or other information. A parameter of supplied power may include, for example, a polarity, alternating current, direct current, voltage amount, current amount, frequency, phase, and/or other parameters. A harvesting parameter may include, for example, a parameter of power that can be generated through a harvesting generator, a parameter that impacts power generated by and/or the generation process of a harvesting generator, and/or other parameters related to the harvesting of energy. An operating status may include, for example, one or more of a powered off status, a powered on status, an offline status, an online status, a limited operational status, a full operational status, a malfunction status, and/or other statuses of energy loads 12. A control mode may include, for example, an automated mode, a manual control mode (e.g., by an external entity), and/or other control modes. A resource availability may refer to and/or quantify an availability of a resource used by one of energy supplies 14 to generate energy. An operating condition may include, for example, an output, an operating temperature, an operating efficiency, an operating speed, an operating rate, and/or other operating conditions.

At least some of the information related to a given energy supply 14 may be entered and/or edited by a user via communications interface 20. The information entered and/or edited by the user may include the information described above. The information entered and/or edited by the user may include operational settings for the given energy supply 14. For example, if the given energy supply 14 includes an energy generator, the user may designate an amount of power, current, and/or voltage (or range of the same) for a LO setting, a different amount of power, current, and/or voltage (or range of the same) for a MID setting, and a different amount of power, current, and/or voltage (or range of the same) for a HI setting. It will be appreciated that this exemplary load type (generator), operation parameter(s) to which the settings correspond (power, current, and/or voltage), number of settings (3), and/or other aspects of the example above are not intended to be limiting.

The information entered and/or edited by the user may include the assignment of variables. These variables may be assigned to identify one or more specific energy supplies 14, specific functions provided by one or more energy supplies 14, specific operational settings of a given energy supply 14, and/or other possible values for the variables. For example, with respect to the example set forth above where the given energy supply includes a generator, a variable may be assigned to each of the HI setting, the LO setting, and the MID setting. Then during the execution of a mission, the generator may be set to operate at one of these settings by calling the appropriate variable.

The mission interface module 36 may be configured to obtain information related to a mission to be performed by energy loads 12 coupled to system 10. This information may include objectives and/or tasks, specific ones of energy loads 12 that are to perform the objectives and/or tasks, temporal parameters, mission criteria, and/or other information related to a mission. The information may be obtained over communication interface 20 from an external entity. By way of non-limiting example, a user may input information defining a mission to system 10 via communication interface 20 (e.g., over a network connection, at a user interface connected with system 10 at communication interface 20, etc.).

Mission interface module 36 may enable one or more users to access mission information. This may include information obtained by mission interface module 36 that defines a mission, information generated by energy loads 12 and/or energy supplies 14 during a mission (e.g., output data, etc.), and/or other information. To safeguard such information, and to limit the ability of unauthorized users to input mission information to system 10, mission interface module 36 may be configured to require users to authenticate themselves before receiving access to system 10 and/or information associated therewith. Authentication may include receiving and verifying authentication information associated with users. The authentication information may include, for example, a username, a password, an ID, biometric information, and/or other information.

Information defining a mission may be obtained in it entirety by mission interface module 36 over communication interface 20, and/or one or more missions may be at least partially pre-stored (e.g., in electronic storage 22). To define a mission, a user may specify a pre-stored mission and/or may make changes or refinements thereto to fully define the mission.

The plan module 38 may be configured to generate a mission plan for executing a mission defined by information obtained by mission interface module 36. A mission plan may identify specific functions to be performed by individual ones of energy loads 12 in order to fulfill the tasks and/or objectives of the mission. The mission plan may include temporal parameters, such as timing, duration, and/or other parameters, for performance of the specific functions by the individual ones of energy loads 12 that enable energy loads 12 to satisfy any temporal parameters of the mission. The mission plan may identify specific functions to be performed by individual ones of energy supplies 14 to provide power sufficient to enable energy loads 12 to perform the objectives and/or tasks of the mission. The mission plan may include temporal parameters, such as timing, duration, and/or other parameters, for performance of the specific functions to be performed by the individual energy supplies 14 to ensure that the power provided to energy loads 12 will be provided at the appropriate times.

In some instances, functions to be performed by individual ones of energy supplies 14 may be conditional on performance of one or more of energy supply 14. For example, the mission plan may indicate that one or more of energy supplies 14 are to remain "on" (providing power) until a specified one or more of energy loads 12 have completed an assigned function (e.g., arrived at a predetermined location, and/or other functions).

Upon receiving information defining a mission plan from mission interface module 36, plan module 38 may analyze the information to ensure that all of the tasks and/or objectives can be performed by the current configuration of energy loads 12 and energy supplies 14 being managed by system 10. This may involve running the information defining the mission through a rules-based analysis that identifies tasks, objectives, and/or combinations of tasks and/or objectives that are not within the capabilities of the current energy loads 12 and/or energy supplies 14. For example, a task or objective may not be within the capabilities of the current energy loads 12 and/or energy supplies 14 if the energy loads 12 do not include energy load(s) 12 capable of performing a function necessary for completing a task or objective. As another example, if the energy supplies 14 are not capable of providing power that enables energy loads 12 to perform a function necessary for completing a task or objective, then that task or objective may not be within the capabilities of the current energy loads 12 and/or energy supplies 14. As another example, temporal restraints associated with one or more tasks and/or objectives may be beyond the capabilities of energy loads 12 and/or the ability of energy supplies 14 to power the energy loads 12.

The rules used to determine whether all of the tasks and/or objectives can be performed by the current configuration of energy loads 12 and energy supplies 14 being managed by system 10 may be somewhat dynamic (e.g., changing automatically over time) in that they may be based on the current configuration of energy loads 12 and energy supplies 14. As the information obtained by load module 32 and/or supply module 34 indicates that one or more energy loads 12 and/or energy supplies 14 has been added and/or removed, then the rules may adapt automatically to accommodate such changes.

If plan module 38 determines that one or more of the objectives and/or tasks associated with a mission cannot be completed, plan module 38 may generate a notification to the external entity that input the mission to system 10. If plan module 38 determines that two or more of the objectives and/or tasks associated with a mission conflict (less than all of them can be completed with existing capabilities/resources), plan module 38 may determine which of the conflicting objectives and/or tasks should be performed. This determination may be based on user-selection, on a predetermined prioritization of objectives and/or tasks, and/or to minimize the number of objectives and/or tasks that are omitted from the mission plan.

In some cases, certain tasks and/or objectives within a given plan may be accomplished by energy loads 12 and/or energy supplies 14 in a variety of different combinations. Plan module 38 may designate a possible combination of energy loads 12 and/or energy supplies 14 (and/or temporal parameters) such that the cumulative performance of energy loads 12 and/or energy supplies 14 over the course of the mission will be enhanced with respect to one or more predetermined criteria. By way of non-limiting example, such criteria may include energy efficiency, temporal speed, mission endurance, and/or other criteria. The criteria for a given mission may be established by the information obtained by mission interface module 36 related to the mission, by a system setting, and/or otherwise established.

In some implementations, load module 32 and/or supply module 34 may be configured to obtain information related to energy loads 12 and/or energy supplies 14 during the execution of a mission. In such implementations, plan module 38 may be configured to adjust the mission plan to accommodate changing and/or unforeseen circumstances. For example, one or more of energy loads 12 and/or energy supplies 14 may not operate at its typical capacity, efficiency, and/or effectiveness, which may require adjustment of the mission plan. As another example, environmental conditions may inhibit and/or aid performance of the tasks and/or objectives in the mission, thereby requiring the adjustment of the mission plan. For instance, under certain ambient temperature conditions, some types of batteries may deliver less efficiently than other attached energy producers (e.g., a fuel cell). As another example, an amount of stored energy within one or more of energy supplies 14 may fall below an anticipated and/or threshold amount, which may require adjustment of the mission plan to account for the unexpectedly low amount of stored energy. Other examples of circumstances that may result in adjustment of the mission plan by plan module 38 are contemplated.

Adjustments to the mission plan made by plan module 38 as the mission is ongoing may be determined to maintain enhanced cumulative performance of energy loads 12 and/or energy supplies 14 with respect to the mission criteria. However, in some implementations, information obtained by load module 32 and/or supply module 34 related to current circumstances during execution of the mission may result in changes being made by plan module 38 to the criteria used to determine the mission plan.

The execution module 40 may be configured to generate machine-readable instructions for energy loads 12 and/or energy supplies 14, and to communicate the instructions to energy loads 12 and/or energy supply 14 with appropriate timing to cause energy loads 12 and/or energy supplies 14 to execute the mission plan. The instructions may be communicated to energy loads 12 and/or energy supplies 14 through power distribution system 26 (e.g., load interfaces 16 and/or supply interfaces 18). In some implementations, instructions generated by execution module 40 may be translated, formatted, and/or otherwise altered by controller 30 to be usable by the specific energy load 12 and/or energy supply 14 for which the instructions are intended. In some implementation, this functionality may be provided by execution module 40.

Figure 2:
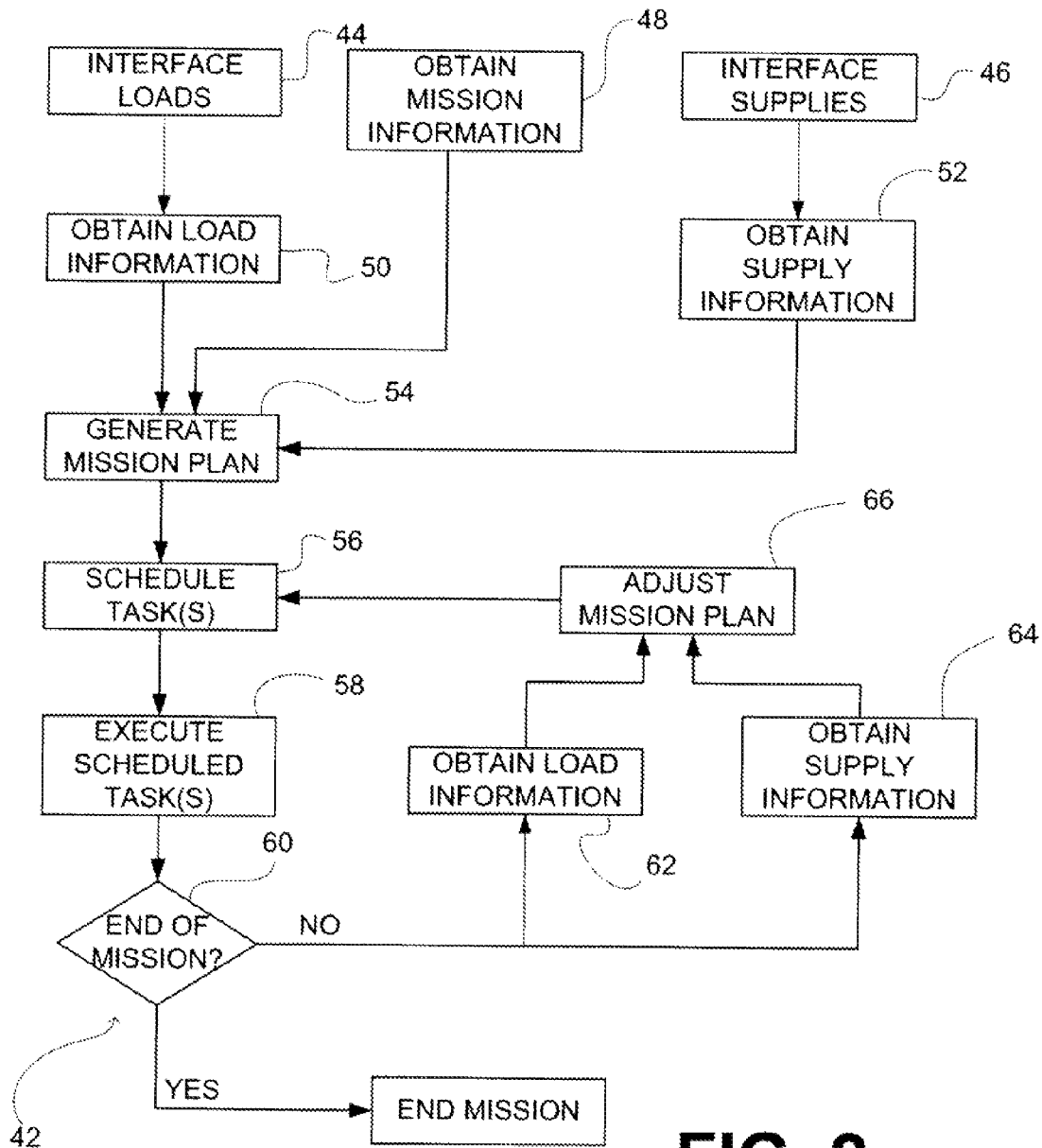
FIG. 2 illustrates a method of controlling and/or managing a plurality of energy loads and energy supplies, according to one or more embodiments of the invention.

FIG. 2 illustrates a method 42 of controlling energy loads and/or energy supplies. The operations of method 42 presented below are intended to be illustrative. In some embodiments, method 42 may be accomplished with one or more additional operations not described, and/or without one or more of the operations discussed. Additionally, the order in which the operations of method 42 are illustrated in FIG. 2 and described below is not intended to be limiting.

In some implementations, method 42 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 42 in response to instructions stored electronically on an electronic storage medium. The one or more processing devices may include one or more devices configured through hardware, firmware, and/or software to be specifically designed for execution of one or more of the operations of method 42.

At an operation 44 a plurality of energy loads may be interfaced with a control system. The interfaces between the energy loads and the control system may enable communication between the energy loads and the control system. In some implementations, operation 44 may be performed by a plurality of load interfaces that are similar to or the same as load interfaces 16 (shown in FIG. 1 and described above).

At an operation 46 a plurality of energy supplies may be interfaced with the control system. The interfaces between the energy supplies and the control system may enable communication between the energy supplies and the control system. The interfaces formed with the energy loads at operation 44 and with the energy supplies at operation 46 may enable the transmission of power therebetween. In some implementations, operation 46 may be performed by a plurality of supply interfaces that are similar to or the same as supply interfaces 18 (shown in FIG. 1 and described above).

At an operation 48, information related to a mission to be performed by the energy loads and/or energy supplies may be obtained. The information related to the mission may include objectives and/or tasks, specific ones of energy loads and/or energy supplies that are to perform the objectives and/or tasks, temporal parameters, mission criteria, and/or other information related to a mission. The information may be obtained over a communication interface from an external entity. In one implementation, the operation 48 may be performed by a mission interface module that is the same as or similar to mission interface module 36 (shown in FIG. 1 and described above).

At an operation 50, information related to the energy loads may be obtained. The information may be obtained from the energy loads, from an external entity, and/or from electronic storage storing information related to the energy loads. In some implementations, the operation 50 may be performed by a load module that is the same as or similar to load module 32 (shown in FIG. 1 and described above).

At an operation 52, information related to the energy supplies may be obtained. The information may be obtained from the energy supplies, from an external entity, and/or from electronic storage storing information related to the energy supplies. In some implementations, the operation 52 may be performed by a supply module that is the same as or similar to supply module 34 (shown in FIG. 1 and described above).

At an operation 54, a mission plan may be generated. The mission plan may be for executing a mission defined by information obtained at operation 52. A mission plan may identify specific functions to be performed by individual ones of the energy loads in order to fulfill the tasks and/or objectives of the mission. The mission plan may include temporal parameters, such as timing, duration, and/or other parameters, for performance of the specific functions by the individual ones of the energy loads that enable energy loads to satisfy any temporal parameters of the mission. The mission plan may identify specific functions to be performed by individual ones of the energy supplies to provide power sufficient to enable the energy loads to perform the objectives and/or tasks of the mission. The mission plan may include temporal parameters, such as timing, duration, dependencies, and/or other parameters, for performance of the specific functions to be performed by the individual energy supplies to ensure that the power provided to the energy loads will be provided at the appropriate times. In some implementations, the operation 54 may be performed by a plan module that is the same as or similar to plan module 38 (shown in FIG. 1 and described above).

At an operation 56, one or more tasks are scheduled for execution. The one or more tasks are scheduled for execution based on the load information obtained at operation 50, the supply information obtained at operation 52, and/or the mission plan generated at operation 54. The tasks may be scheduled according to the temporal parameters and/or dependencies set forth in the mission plan. In some implementations, operation 56 may be performed by an execution module that is the same as or similar to execution module 40 (shown in FIG. 1 and described above).

At an operation 58, execution of the one or more tasks scheduled at operation 56. Execution of the scheduled tasks may be initiated by generating machine-readable instructions for the energy loads and energy supplies that prompt the energy loads and energy supplies to perform the functions associated with the scheduled tasks. In some implementations, operation 58 may be performed by an execution module that is the same as or similar to execution module 40 (shown in FIG. 1 and described above).

At an operation 60, a determination is made as to whether the mission is complete. If the mission is complete, then method 42 is ended. If the mission is not complete, then method 42 goes to operations 62 and 64, at which information related to the energy loads and/or energy supplies is obtained. This information may include information related to the performance of the energy loads and/or energy supplies during execution of the mission, information about surroundings (e.g., the environment) of the energy loads and/or energy supplies during the mission, and/or other information. Operations 62 and 64 may be performed by the load module and the supply module that performed operations 50 and 52.

Method 42 then proceeds to operation 66, where the previously generated mission plan may be adjusted (if necessary) based upon the information obtained at operation(s) 62 and/or 64. Operation 66 may be performed by a plan module that is the same as or similar to plan module 38 (shown in FIG. 1 and described above). The adjusted mission plan may then be implemented at operation 56 to schedule more tasks according to the adjusted mission plan.

Although the invention has been described in detail for the purpose of illustration based on what is currently considered to be the most practical and preferred embodiments, it is,to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to control energy loads and energy supplies, the system comprising:
   a plurality of load interfaces configured to removably couple energy loads to the system to communicatively link the energy loads with the system, the load interfaces comprising a first load interface;
   a plurality of supply interfaces configured to removably couple energy supplies to the system to communicatively link the energy supplies with the system, wherein the energy supplies are coupled with the energy loads to permit the transfer of power therebetween, the supply interfaces comprising a first supply interface;
   a communication interface configured to transmit information from and/or receive information to the system;
   one or more processors configured to execute one or more computer program modules, the one or more computer program modules comprising:
      a load module configured to obtain information related to the energy loads coupled with the system via the load interfaces such that, responsive to the energy loads including a first energy load coupled to the first load interface, the load module is configured to obtain one or more of an identification of the first load, a load type of the first load, or information indicating at least one power specification of the first load;
      a supply module configured to obtain information related to the energy supplies coupled to the system via the supply interfaces such that, responsive to the energy supplies including a first energy supply coupled to the first supply interface, the supply module is configured to obtain one or more of an identification of the first energy supply, a supply type of the first energy supply, or information indicating at least one power specification of the first energy supply;
      a mission interface module configured to obtain information related to a mission to be performed by the energy loads coupled to the system via the load interfaces;
      a plan module configured to automatically generate a mission plan for executing the mission obtained by the mission interface module based on the information related to energy loads obtained by the load module and the information related to energy supplies obtained by the supply module, wherein the mission plan identifies functions to be performed by the energy loads to execute the mission, identifies functions to be performed by the energy supplies to provide power to the energy loads sufficient to enable the energy loads to perform the functions identified for the energy loads in the mission plan, and prospectively indicates timings in the future for the functions to be performed by the energy loads and the functions to be performed by the energy supplies, and wherein the plan module is configured to generate the mission plan in advance of commencement of execution of the mission.

2. The system of claim 1, wherein the one or more computer program modules further comprise an execution module configured to automatically generate machine-readable instructions for the energy supplies and the energy loads that are communicated to the energy supplies and the energy loads over the supply interfaces and the load interfaces, respectively, the instructions generated for the energy loads including instructions that cause the energy loads to perform the functions identified in the mission plan in accordance with the timing identified in the mission plan, and the instructions generated for the energy supplies including instructions that cause the energy supplies to perform the functions identified in the mission plan in accordance with the timing identified in the mission plan.

3. The system of claim 1, wherein the supply module is further configured to obtain operational information related to the energy supplies coupled to the system via the supply interfaces during execution of the mission plan, and wherein the plan module is further configured to dynamically adjust the mission plan during execution of the mission plan based on the operational information obtained during execution of the mission plan.

4. The system of claim 3, wherein the load module is further configured to obtain operational information related to the energy loads coupled to the system via the load interfaces during execution of the mission plan, and wherein the plan module is further configured such that dynamic adjustment of the mission plan during execution of the mission plan is further based on the operational information related to the energy loads obtained during execution of the mission plan.

5. The system of claim 1, wherein the mission module is configured such that in generating the mission plan the mission module enhances the cumulative performance of the energy loads and/or energy supplies according to one or more predetermined criteria.

6. The system of claim 5, wherein the one or more predetermined criteria are mission specific.

7. The system of claim 5, wherein the one or more predetermined criteria include one or more of enhancing energy efficiency, enhancing speed of the mission, or enhancing mission endurance.

8. The system of claim 1, wherein the load module is further configured to obtain one or more of a functional capability of the first load, an operating status of the first load, a control mode of the first load, or an output signal indicating an environmental parameter of the first load.

9. The system of claim 1, wherein the supply module is further configured to obtain one or more of a harvesting parameter of the first energy supply, an operating status of the first energy supply, a control mode of the first energy supply, or a resource availability for the first energy supply.

10. The system of claim 1, wherein the system is configured to be carried by a vehicle, and wherein one or more of the energy loads coupled with the system via the load interfaces is configured to propel and/or steer the vehicle.

11. A method of controlling energy loads and energy supplies, the method comprising:
selectively and releasably interfacing a control system comprising one or more processors with a plurality of energy loads to enable communication between the energy loads and the control system, the energy loads comprising a first energy load;
selectively and releasably interfacing the control system with a plurality of energy supplies to enable communication between the energy supplies and the control system, wherein the energy supplies are in coupled with the energy loads to permit the transfer of power therebetween, the energy supplies comprising a first energy supply;
executing one or more computer program modules on the one or more processors of the control system to obtain information related to the energy loads via the interfaces with the energy loads, the information comprising one or more of an identification of the first energy load, a load type of the first energy load, or information indicating at least one power specification of the first energy load;
executing one or more computer program modules on the one or more processors of the control system to obtain information related to the energy supplies via the interfaces with the energy supplies, the information comprising one or more of an identification of the first energy supply, a supply type of the first energy supply, or information indicating at least one power specification of the first energy supply;
executing one or more computer program modules on the one or more processors of the control system to obtain information related to a mission to be performed by the energy loads;
executing one or more computer program modules on the one or more processors of the control system to automatically generate, in advance of execution of the obtained mission, a mission plan for executing the obtained mission, wherein the mission plan is generated based on the obtained information related to energy loads and the obtained information related to energy supplies, and wherein the mission plan identifies functions to be performed by the energy loads to execute the mission, identifies functions to be performed by the energy supplies to provide power to the energy loads sufficient to enable the energy loads to perform the functions identified for the energy loads in the mission plan, and prospectively indicates timings in the future for the functions to be performed by the energy loads and the functions to be performed by the energy supplies.

12. The method of claim 11, further comprising executing one or more computer program modules on the one or more processors of the control system to automatically generate machine-readable instructions for the energy supplies and the energy loads that are communicated to the energy supplies and the energy loads over the interfaces between the energy supplies and the control system and the interfaces between the energy loads and the control system, respectively, the instructions generated for the energy loads including instructions that cause the energy loads to perform the functions identified in the mission plan in accordance with the timing identified in the mission plan, and the instructions generated for the energy supplies including instructions that cause the energy supplies to perform the functions identified in the mission plan in accordance with the timing identified in the mission plan.

13. The method of claim 11, further comprising:
executing one or more computer program modules on the one or more processors of the control system to obtain operational information for the energy supplies during execution of the mission plan; and
executing one or more computer program modules on the one or more processors of the control system to dynamically adjust the mission plan during execution of the mission plan based on the obtained operational information.

14. The method of claim 13, further comprising:
executing one or more computer program modules on the one or more processors of the control system to obtain operational information related to the energy loads during execution of the mission plan; and
executing one or more computer program modules on the one or more processors of the control system to dynamically adjust the mission plan during execution of the mission plan based on the obtained operational information related to the energy loads.

15. The method of claim 11, wherein in generating the mission plan the one or more processors of the control system enhance the cumulative performance of the energy loads and/or energy supplies according to one or more predetermined criteria.

16. The method of claim 15, wherein the one or more predetermined criteria are mission specific.

17. The method of claim 15, wherein the one or more predetermined criteria include one or more of enhancing energy efficiency, enhancing speed of the mission, or enhancing mission endurance.

18. The method of claim 11, wherein the obtained information related to the first energy load comprises one or more of a functional capability, an operating status, a control mode, an output signal indicating an environmental parameter, or an operating condition.

19. The method of claim 11, wherein the obtained information related to the first energy supply comprises one or more of a harvesting parameter of the first energy supply, an operating status of the first energy supply, a control mode of the first energy supply, or a resource availability of the first energy supply.

20. The method of claim 11, wherein the control system is configured to be carried by a vehicle, and wherein one or more of the energy loads coupled with the system via the load interfaces are configured to propel and/or steer the vehicle.

21. The method of claim 11, further comprising executing one or more computer program modules on the one or more processors of the control system to set one or more variables for operational settings of one or more of the energy supplies based on input from a user received at the control system via a communications interface.

22. The method of claim 13, further comprising executing one or more computer program modules on the one or more processors of the control system to set one or more variables for operational settings of one or more of the energy loads based on input from a user received at the control system via a communications interface.

* * * * *